Feb. 9, 1932. H. O. BOEHME ET AL 1,844,239
POWER TRANSMISSION
Filed March 14, 1929   3 Sheets-Sheet 1

WITNESS
Oliver W. Holmes

Inventors
Herman O. Boehme, Ernest Knopp
and Frank Kune
By his Attorneys

Feb. 9, 1932.     H. O. BOEHME ET AL     1,844,239
POWER TRANSMISSION
Filed March 14, 1929     3 Sheets-Sheet 3

WITNESS
Oliver W. Holmes

Inventors
Herman O. Boehme, Ernest Knopp
and Frank Kune.
By his Attorneys
Knight Bros.

Patented Feb. 9, 1932

1,844,239

UNITED STATES PATENT OFFICE

HERMAN O. BOEHME, OF LEONIA, NEW JERSEY, AND ERNEST KNOPP, OF BRONX, AND FRANK KUNC, OF NEW ROCHELLE, NEW YORK, ASSIGNORS TO H. O. BOEHME, INC., OF NEW YORK, N. Y., A CORPORATION OF NEW YORK

POWER TRANSMISSION

Application filed March 14, 1929. Serial No. 346,932.

This invention relates to power transmissions in which motion is transmitted by friction, as in friction gears, feed-roller devices, belt and pulley devices, clutches, etc.

In devices of this character efficiency demands that the transmitting friction be adjusted to the load. On the one hand, the pressure between the frictionally-engaged members should be high enough to avoid slipping but, on the other hand, it is desirable to keep this pressure at the lowest effective value in order to diminish wear and loss of power. When the load is substantially constant the manual adjustment of the pressure to the load is comparatively simple but manual adjustment is impracticable where the load changes frequently.

It is the principal object of our invention to provide means for automatically adjusting the pressure between the friction members in correspondence with and in response to variations of the load. It is a further object of our invention to provide means for relieving the pressure when the machine is idle, which is of particular importance when one or more of the friction elements are of relatively less-rugged material, such as rubber, fibre composition, etc.

With the above-mentioned objects in view, our invention consists in providing one or more of the frictionally-engaged members with axial play or a shifting movement transverse to the direction of transmission; tapering the friction surface of one or more of said members, so that the shifting movement, depending upon its direction, will either increase or decrease the pressure between the members; and transmitting the power motion to or from the axially shiftable member or members through a special form of gearing, such as oblique tooth gears, which develops an axial thrust upon the shiftable member or members proportional to the load. Preferably, two of the friction members are reversely tapered, as in variable speed cone transmissions, whereas only one of the members (either the driving or the driven member) is provided with axial play and with the oblique tooth gearing or its equivalent. It is also preferred to provide the shiftable member with a spring or equivalent means tending to develop a minimum operating pressure between the members. As a subordinate feature, the invention comprises auxiliary manual means whereby the shiftable member may be axially moved to a position in which the operating pressure will be substantially or entirely relieved when the machine is idle.

In the accompanying drawings there is shown an illustrative embodiment of the invention as applied to a tape puller for recording telegraph receivers or similar instruments.

Figure 1:
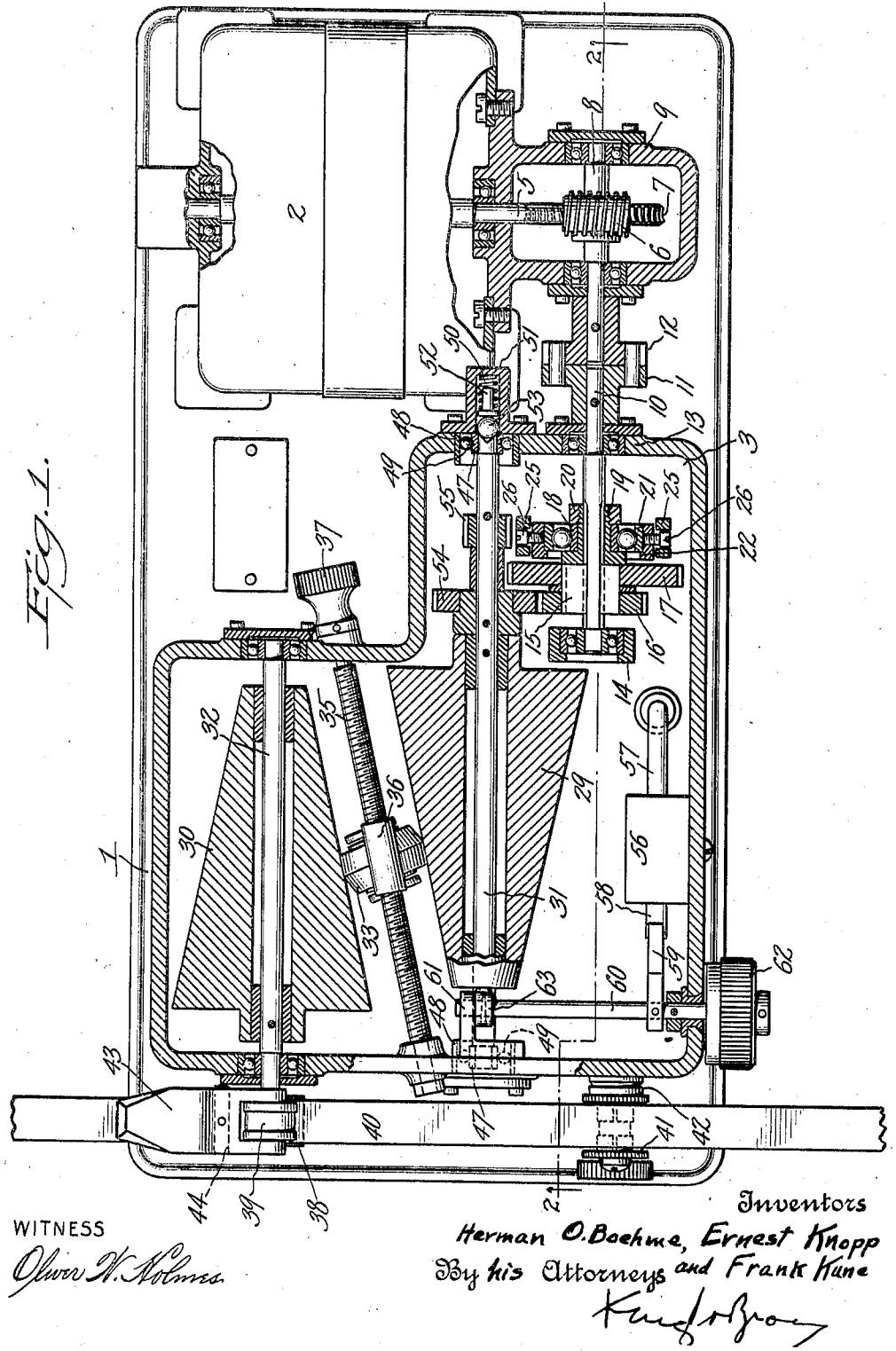
Figure 1 is a central horizontal section, the motor housing being shown in plan, partly broken away.
Figure 2:
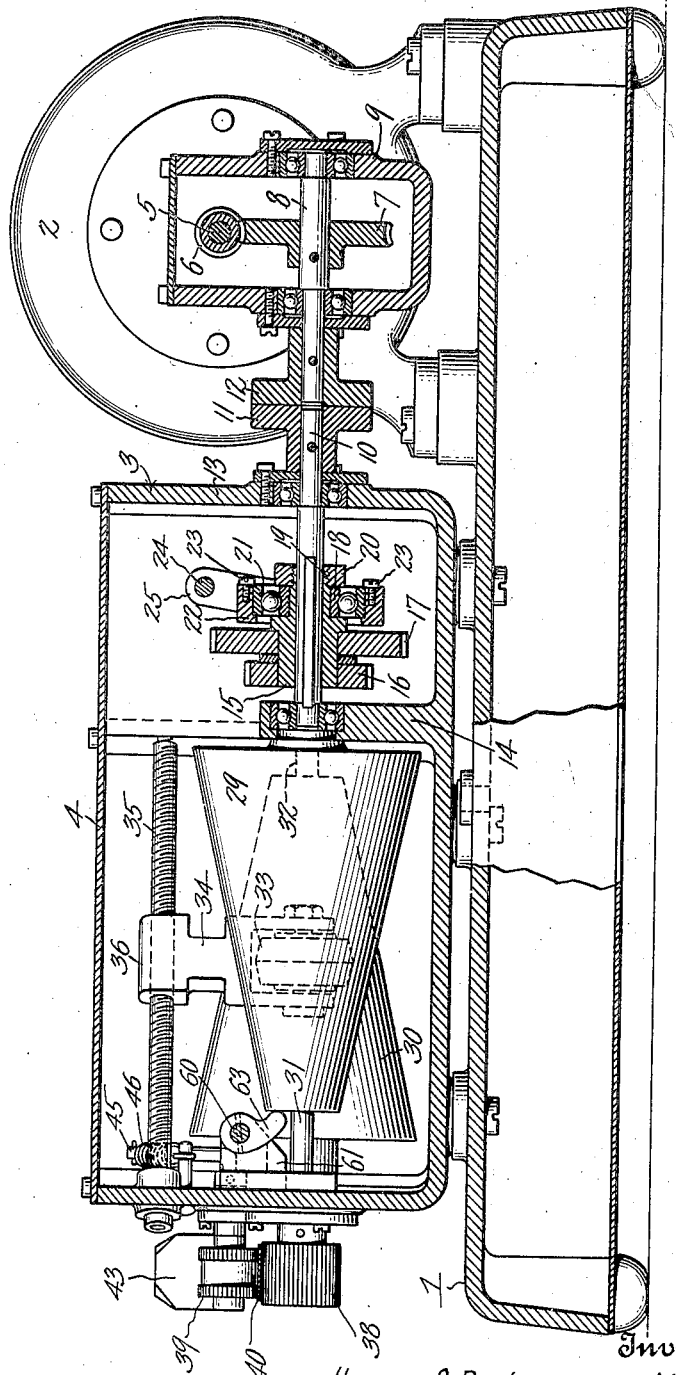
Figure 2 is a vertical section on the line 2—2 of Figure 1.

1 designates a bed upon which are mounted an electric motor 2 and gear box 3 with its cover plate 4. Power shaft 5 is provided with a worm 6 which meshes with a worm gear 7 on a shaft 8, these parts being housed in an extension 9 of the motor casing and the shafts 5 and 8 being journalled in the walls of said extension. Shaft 8 is coupled to shaft 10 by means of coupling members 11 and 12. Shaft 10 is journalled in the wall 13 of the gear box and, at its inner end, this shaft is journalled in a standard 14 projecting from the floor of the gear box. Keyed to the shaft 10 is a sleeve 15 upon which are mounted change-speed gears 16 and 17. An inner ball race 18 is held in place upon the threaded reduced portion 19 of sleeve 15 by means of a nut 20 and an outer ball race 21 is held within shouldered collar 22 by means of overhanging screws 23. An axial movement may be imparted to collar 22 to shift gears 16 and 17 by rotating shaft 24 to swing the arms 25 which are pivotally engaged with screws 26 tapped into collar 22. Shaft 24 may be rocked by means of a grip 27 and a spring-pressed plunger 28 engages recesses on the gear box to lock the gears in one or the other of two positions.

A pair of oppositely tapered cones 29 and 30 are carried by rotatable parallel shafts 31 and 32 which are journaled in the walls of the gear box. An idler pinion 33 of fibre composition or other suitable material and of usual construction is disposed between the cones, being journaled in a yoked hanger 34 supported by threaded bar 35, the threads of which engage corresponding threads in the head 36. Bar 35 is journaled in the walls of the gear box and upon being rotated by means of grip 37 will cause pinion 33 to traverse the gap between the cones and thus step up or step down as desired, the speed of the driven cone 30.

Figure 3:
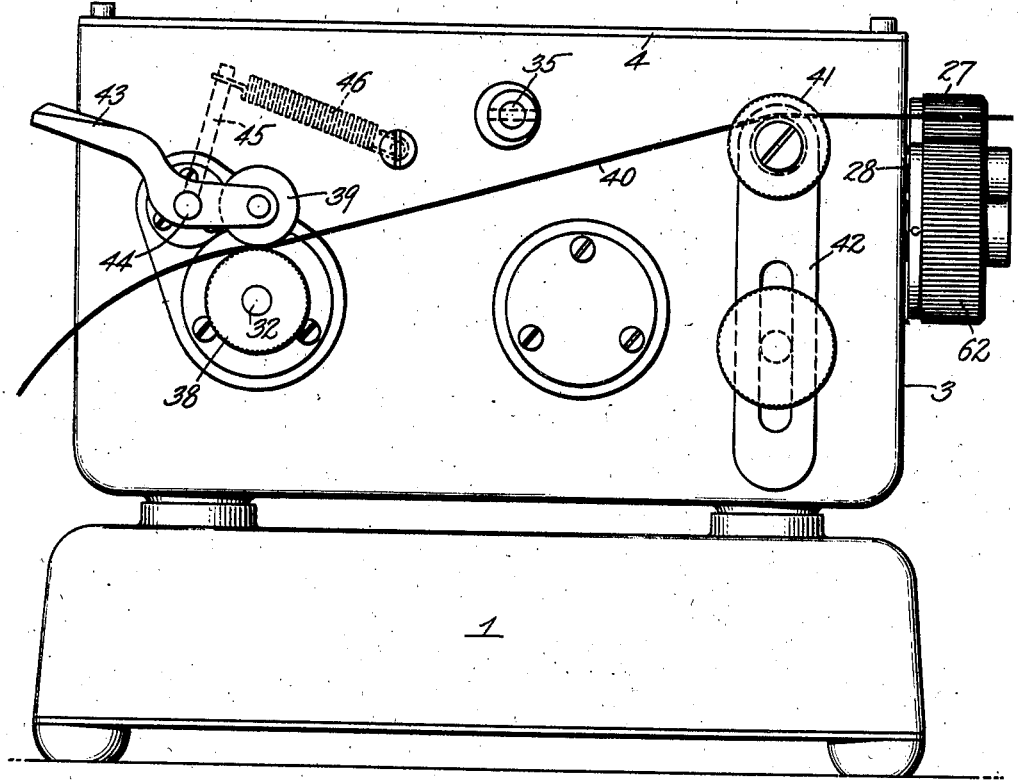
Figure 3 is an end elevation looking from the left in Figure 1.

The shaft 32 projects through the gear box and has on its outer end a knurled feed roller 38 which cooperates with an idling roller 39 to pull recording tape 40 (from right to left in Figure 3). The tape is assumed to come from a telegraph receiver, which is not shown, and travels over a guide roller 41, the vertical position of which may be adjusted by means of a slide 42. To facilitate inserting the tape, roller 39 journaled in a yoked rocker arm 43 pivotally mounted upon a pin 44. A rigid arm 45 is carried upon the inner end of pin 44 and is secured to a spring 46. Roller 39 may be elevated by pressing down the rocker arm 43 against the action of spring 46.

Referring again to cone 29 and its shaft 31, it will be observed that the latter may be axially shifted through a small distance in order to vary the width of the gap between the cones and thus vary the pressure between the cones and idler pinion. On each end of this shaft there is fixed a collar 47 which constitutes the inner race of a ball bearing, the outer race of each bearing consisting of a bushing 48 secured in an opening in the wall of the gear box. An annular groove on each collar 47 engages the balls 49, which are free to travel axially on the bushings 48, the latter being elongated sufficiently to accommodate the desired range of movement. A compression spring 50, housed in box 51, exerts an axial thrust upon shaft 31 through stud 52 and ball 53.

Figure 4:
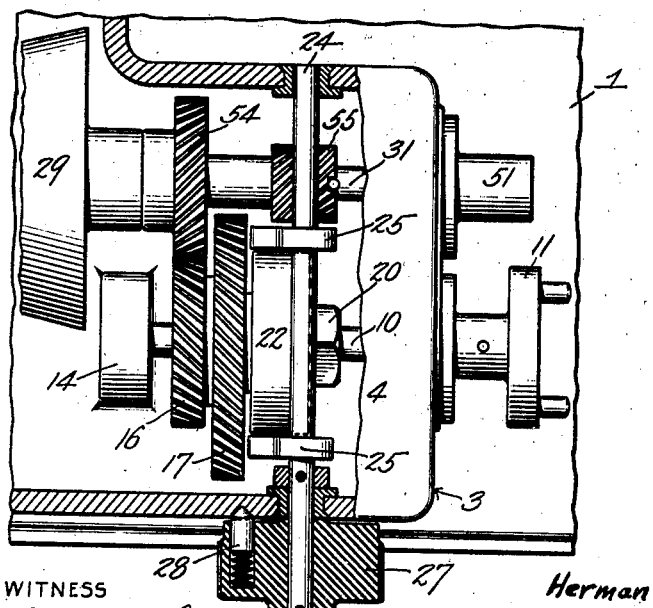
Figure 4 is a plan view on a larger scale showing gearing details, the gearing box cover and other parts being broken away.
Figure 5:
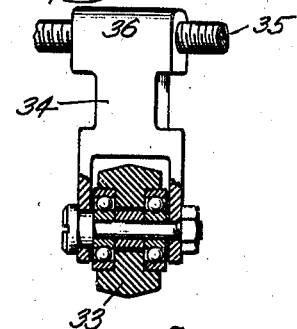
Figure 5 is an enlarged detail, partly in section, of a traversing idler pinion and associated parts.

Gears 54 and 55 are keyed on shaft 31 and are disposed for selective engagement with one or the other of shiftable gears 16 and 17, respectively. As shown most clearly in Fig. 4, gears 16, 17, 54, 55, have oblique teeth, so that when gear 16 drives gear 54, or gear 17 drives gear 48, an axial thrust is exerted upon shaft 31, in the same direction as the thrust exerted by spring 50. The thrust of spring 50 is constant and it is given a value which will produce, conjointly with the oblique tooth gears, the desired operating pressure between the cones 29, 30 and idler pinion 33. The axial thrust produced by the interaction of the gears will be proportional to the resistance to rotation offered by the shaft 31 and its gears 54 or 55; and this resistance will vary with the load. Thus, if the load increases, as when the speed is increased, cone 29 will be more strongly urged in the direction which increases the pressure between the frictionally engaged members. In this way the tendency to slip, which would ordinarily vary with the load, will be compensated automatically by corresponding variations of the frictional resistance.

The means for relieving the pressure between the cones and idler pinion, when the machine is idle, will now be described. 56 designates a switch box secured to the gear box and containing a switch of any usual or suitable construction. Conductors pass through conduit 57 and thence to the motor terminals (not shown). A switch lever 58 projects from the box 56 and is engaged by a yoked rocker arm 59 fixed on a shaft 60. This shaft is journaled at one end in a bracket 61 and the other end projects through the gear box and carries a grip 62. A finger 63 is keyed to shaft 60 adjacent cone 29. When grip 62 is rotated anti-clockwise arm 59 throws switch lever 58 up to its "off" position while finger 63 forces cone 29 inwardly against the pressure of spring 50. In this position, which is that shown in the drawings, the gap between the cones is maximum and the friction pressure is substantially or entirely relieved. The parts are maintained in the "off" position by lever 58 which holds up arm 59. A clockwise movement of grip 62 throws lever 58 down to start the motor and withdraws finger 63 from cone 29, permitting the latter to move into pressure-exerting position under the influence of spring 50 and oblique tooth gears 16, 54 or 17, 55.

The operation of the device has been sufficiently described in connection with the description of the structure. It will be understood that the tape-puller, shown and described herein, has been chosen merely as a representative embodiment of the invention, and that the invention is applicable to any device in which motion is transmitted by friction and in which fluctuations of load are to be provided for. In tape-pullers for recording telegraphs, fluctuations of load will be caused mainly by variations of the speed at which the tape is made to travel; but the utility of the invention is not limited to variable speed devices.

We claim:—

1. In friction transmission, a pair of friction members mounted for movement upon fixed axes and engaged for transmission of movement from one to the other, one of said members being also shiftable along its axis in a line oblique to the tangential plane of contact between said members, a third transmission member, and connecting means between said third member and said shiftable member, said connecting means having reaction components corresponding to both movements of said shiftable member.

2. In friction transmission, a pair of friction members mounted for movement upon fixed axes and engaged for transmission of movement from one to the other, one of said members being also shiftable along its axis in a line oblique to the tangential plane of contact between said members, whereby shifting said shiftable member in one direction will increase and in the other direction will decrease the working pressure between said friction members, a third transmission member, and connecting means between said third member and said shiftable member, said connecting means having a reaction component tending to shift said shiftable member in the pressure-increasing direction.

3. In friction transmission, a pair of friction members engaged for transmission of movement from one to the other, one of said members being also shiftable in a line oblique to the tangential plane of contact between the members, whereby shifting said shiftable member in one direction will increase and in the other direction will decrease the working pressure between said friction members, a third transmission member, connecting means between said third member and said shiftable member, said connecting means having a reaction component tending to move said shiftable member in the pressure-increasing direction, and auxiliary means tending to move said shiftable member in the same direction.

4. In friction transmission, a pair of rotary friction members peripherally engaged, one of said members being tapered and axially shiftable, a third transmission member, and oblique tooth gears connecting said third member to said shiftable member, whereby the tapered member is urged in the axial direction which increases the working pressure between the friction members, the axial thrust being proportional to the transmission load.

5. In friction transmission, a pair of rotary friction members peripherally engaged, one of said members being tapered and axially shiftable, a third transmission member, oblique tooth gears connecting said third member to said shiftable member, whereby the shiftable member is urged in the axial direction which increases the working pressure between the friction members, the axial thrust being proportional to the transmission load, and auxiliary means constantly urging said shiftable member in the same axial direction.

6. In friction transmission, a pair of oppositely tapered cone pulleys rotatably mounted upon parallel axes, one of said pulleys being axially shiftable, an idler pinion between the opposed surfaces of the pulleys and peripherally engaged therewith, means for traversing said pinion longitudinally along said opposed surfaces, another transmission member, oblique tooth gears connecting said last-mentioned member to said shiftable pulley, whereby said pulley is urged in the axial direction which increases the working pressure between said pulleys and idler pinion, the pressure being proportional to the transmission load.

HERMAN O. BOEHME.
ERNEST KNOPP.
FRANK KUNC.